United States Patent [19]

Pandolei

[11] Patent Number: 5,214,415
[45] Date of Patent: May 25, 1993

[54] CURSOR CONTROL ASSEMBLY WITH ELECTROMAGNETIC SHIELDING

[75] Inventor: Richard Pandolei, Smithtown, N.Y.

[73] Assignee: Miltope Corporation, Melville, N.Y.

[21] Appl. No.: 658,225

[22] Filed: Feb. 20, 1991

[51] Int. Cl.⁵ .............................. G09G 3/02
[52] U.S. Cl. .................... 340/709; 340/706
[58] Field of Search .......... 340/709, 706, 710; 273/148 B; 74/471 XY; 200/6 A; 361/424; 174/35 R, 35 MS

[56] References Cited

U.S. PATENT DOCUMENTS

| | | | |
|---|---|---|---|
| 4,533,830 | 8/1985 | Beaupsey | 340/709 |
| 4,538,476 | 9/1985 | Quque | 273/148 B |
| 4,829,432 | 5/1989 | Hershberger et al. | 361/424 |
| 4,922,444 | 5/1990 | Baba | 340/710 |
| 4,933,670 | 6/1990 | Wislocki | 340/706 |
| 4,951,034 | 8/1990 | Majjone et al. | 74/471 XY |
| 4,952,919 | 8/1990 | Nippoldt | 360/706 |

Primary Examiner—Ulysses Weldon
Assistant Examiner—Regina Liang
Attorney, Agent, or Firm—Whitham & Marhoefer

[57] ABSTRACT

A cursor control assembly in which an electrically conducting movable control element (e.g., a ball or roller) is electrically coupled to an electrically conducting housing so that the combination of the movable control element and the housing provides a conductive enclosure for the cursor control assembly electronic components and transducers.

4 Claims, 4 Drawing Sheets

CURSOR CONTROL ASSEMBLY WITH ELECTROMAGNETIC SHIELDING

BACKGROUND OF THE INVENTION

1. Field of the Invention

The present invention generally relates to an improvement in ball and slide-roller cursor control assemblies, and more particularly to an assembly which is sealed with respect to electromagnetic susceptibility and radiation.

2. Description of the Prior Art

Slide-roller and ball-type cursor control assemblies are well known and widely used for controlling, with a single control element, the position of a cursor along two axes of a cathode ray tube (CRT) display or other equivalent flat panel or projection display. The ball-type cursor control includes so called "track balls", where the assembly is stationary and an operator directly manipulates the ball, and so called "mouse" assemblies where an operator moves the assembly over a surface which engages and rotates the ball. In a slide-roller cursor control assembly, the operator manipulates an actuator bar, rotating it to position the cursor along one axis (e.g., the X-axis) and sliding the bar along its longitudinal axis to position the cursor with respect to another axis (e.g., the y-axis). This invention is applicable to both ball and slide-roller cursor control assemblies.

It will be appreciated that ball and slide-roller cursor control assemblies house transducers and electronic components that are a source of electromagnetic radiation and at the same time are susceptible to damage or malfunction if exposed to high energy electromagnetic fields.

SUMMARY OF THE INVENTION

One object of this invention is the provision of a ball or slide-roller cursor control assembly which limits electromagnetic radiation from the assembly. Certain product specifications, TEMPAST for example, set limits on the amount of such radiation from a system.

Another object of the invention is the provision of a ball or slide-roller cursor control assembly which is protected against high energy electromagnetic pulses and induced high energy fields which could disturb or damage the transducers and electronic components in the assembly and in the equipment to which the cursor control is connected.

A further object of the invention is the provision of a ball or slide-roller cursor control assembly which provides both electromagnetic shielding and a seal to keep out environmental contaminants such as dirt and water.

Briefly, this invention contemplates the provision of a cursor control assembly in which an electrically conducting movable control element (e.g., a ball or rod) is electrically coupled to an electrically conducting housing so that the combination of the movable control element and the housing provides a conductive enclosure for the cursor control assembly electronic components and transducers.

In one embodiment of a ball-actuated cursor control assembly in accordance with the invention, a conductive brush surrounds the ball where it protrudes from the housing and the brush electrically couples the conductive housing to the conductive ball thereby providing a completely conductive enclosure while at the same time allowing unimpeded rotation of the ball with respect to the housing. A resilient circumferential ring outboard of the conductive brush seals out environmental contaminates such as dirt and liquids.

In a slide-roller embodiment, a conductive bearing is utilized to allow axial and radial low friction motion. This bearing also acts as a seal to prevent environmental contaminates such as dirt and liquids from entering the unit.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
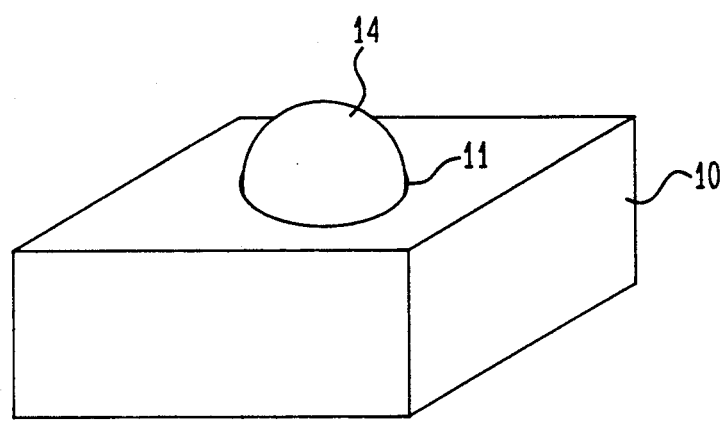
FIG. 1 is a perspective view of a track-ball cursor positioning device.
Figure 2:
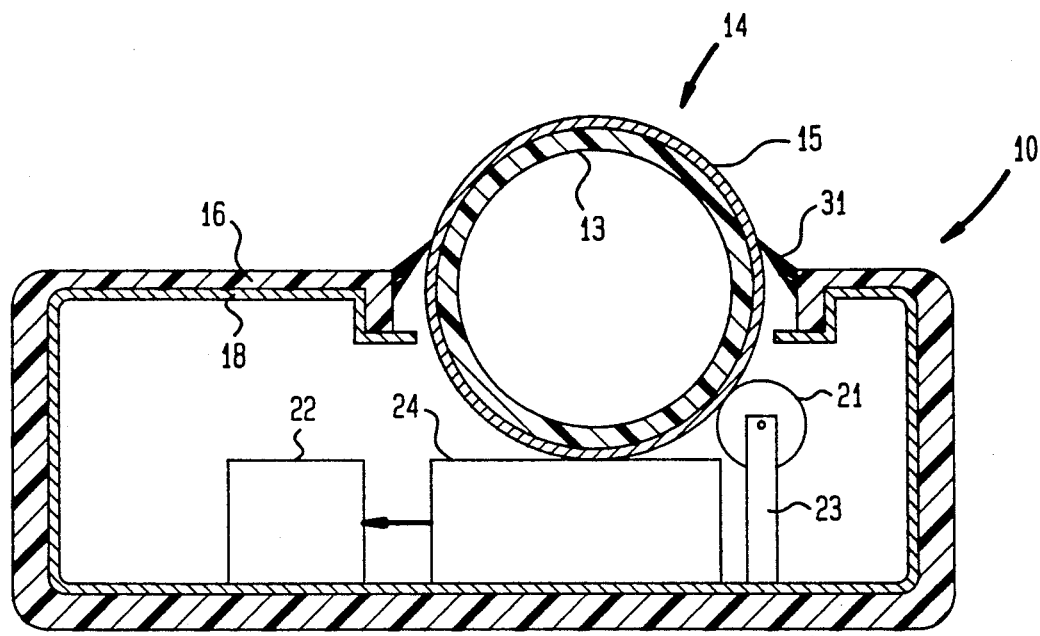
FIG. 2 is a sectional view of one embodiment of the invention applied to a track-ball device of the type shown in FIG. 1 with conventional electronic components and ball movement sensors shown in block form.

Referring now to FIGS. 1 and 2 of the drawings, a track-ball cursor positioning device in accordance with this invention comprises a conventionally shaped enclosure 10 with an opening 11 from which protrudes a rotatable ball 14. While it will be appreciated that any suitable conductive ball may be used in the practice of the invention, in a preferred embodiment of the invention, the ball 14 comprises a hollow plastic sphere 13 with a smooth, conductive exterior coating 15, a chromium coating for example. The enclosure 10 is also electrical conducting. In a preferred embodiment, the enclosure comprises a molded plastic base 16 with a conductive coating 18 on its interior surface; an aluminum coating for example. It will be appreciated that the exterior surface could be coated, if desired, or the base itself could be made of a conductive material.

In the embodiment of the invention shown in FIG. 2, a conductive ball 21 is rotatably maintained by a support 23 located inside the enclosure 10. The ball 21 contacts the surface of ball 14 and serves to electrically couple the conductive ball 14 to the conductive coating 18 of the enclosure 10 without impeding the motion of the ball 14. Electrical coupling between ball 21 and coating 18 may be achieved by making the support 23 itself of a conductive material or by means of a separate grounding lead (not shown) which makes frictional contact with the ball 21 and is secured to the coating 18.

Figure 4:
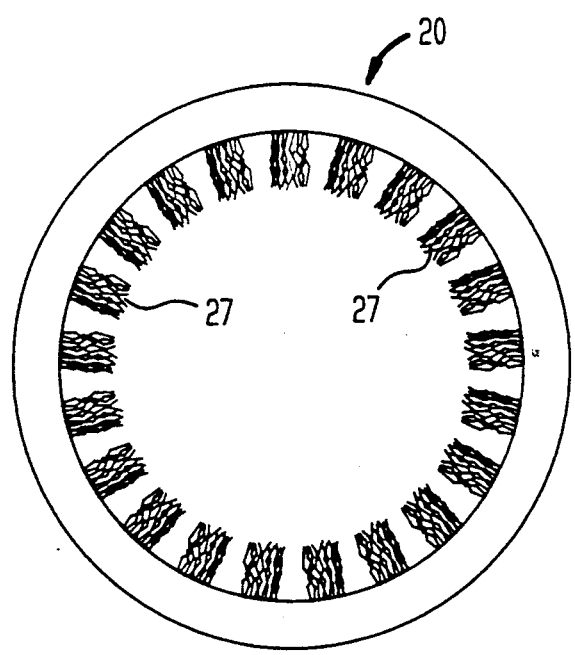
FIG. 4 is a plan view of the conductive brush shown in FIG. 3.
Figure 3:
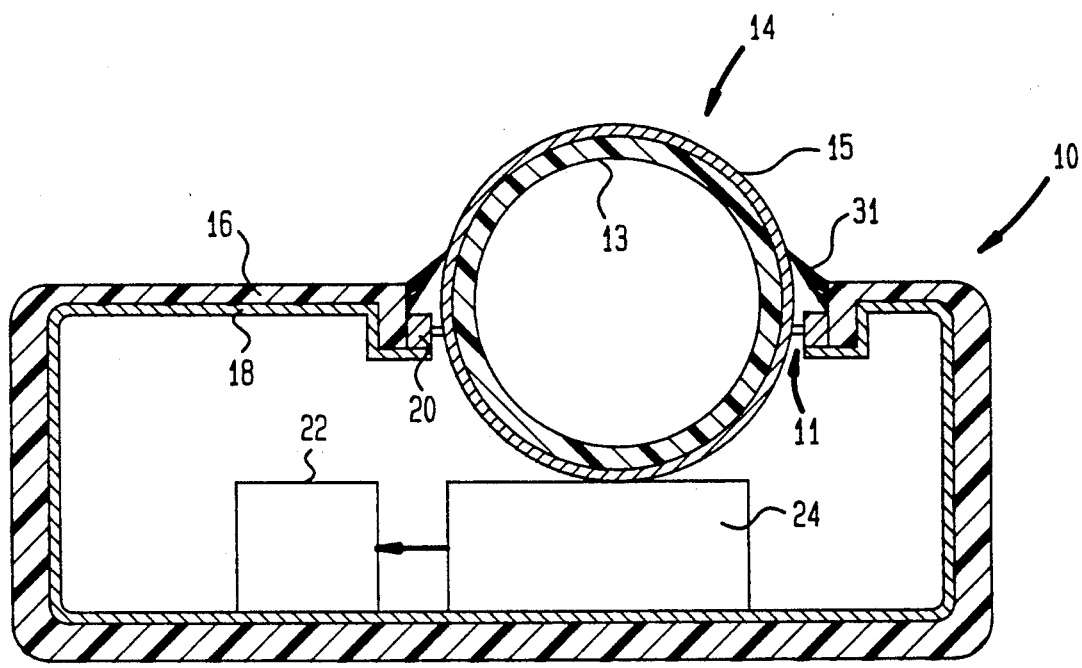
FIG. 3 is a sectional view similar to FIG. 2 of an alternative embodiment of the invention.

In the embodiment of FIG. 3 a ring-shaped conductive brush 20 (shown separately in FIG. 4) is mechanically secured to the base 16, surrounds the periphery of the opening 11, and electrically connects to the conductive coating 18 to the conductive ball 14. This brush may be used in place of the ball 21 of FIG. 2 or, if desired both means of electrical coupling between the ball 14 and the enclosure may be used. Conductive fingers 27 of the brush 20 contact the conductive surface coating 15 of the ball 14 so that the combination of the conductive coating 18, the conductive ball 14, and the conductive brush 20 provides a completely conductive enclosure for electronic components 22 and ball motion sensors 24 disposed in the enclosure 10. These components and position sensors may be any of a number of known designs and arrangements suitable for a particular application, such as disclosed in U.S. Pat. Nos. 4,952,919, 4,933,670, 4,881,065, 4,559532 and 4,538,476, for example. The conductive brush fingers 27 may be made of any suitable pliant conductive material such as copper. The conductive brush should not impede the movement of the sphere or cause wear of its surface.

A pliable plastic seal 31 is also secured to the housing 10 around the periphery of the opening 11 and outboard of the conductive brush 20. The seal 31 is made of a pliable low-friction material such as Teflon or Rulon and excludes environmental contaminants such as water, sand and dirt from the housing interior and from the conductive brush. In addition, the seal 31 exerts a component of force that urges the ball 14 into the enclosure. The seal 31 is also used in the embodiment of the invention shown in FIG. 2.

Figure 5:
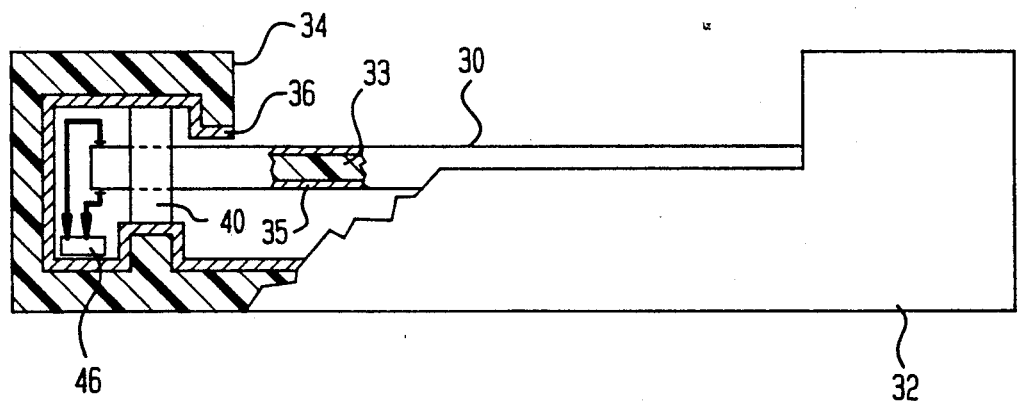
FIG. 5 is a front elevation, with parts in section, and parts shown schematically, of one embodiment of a slide-roller cursor control in accordance with the teachings of this invention.
Figure 6:
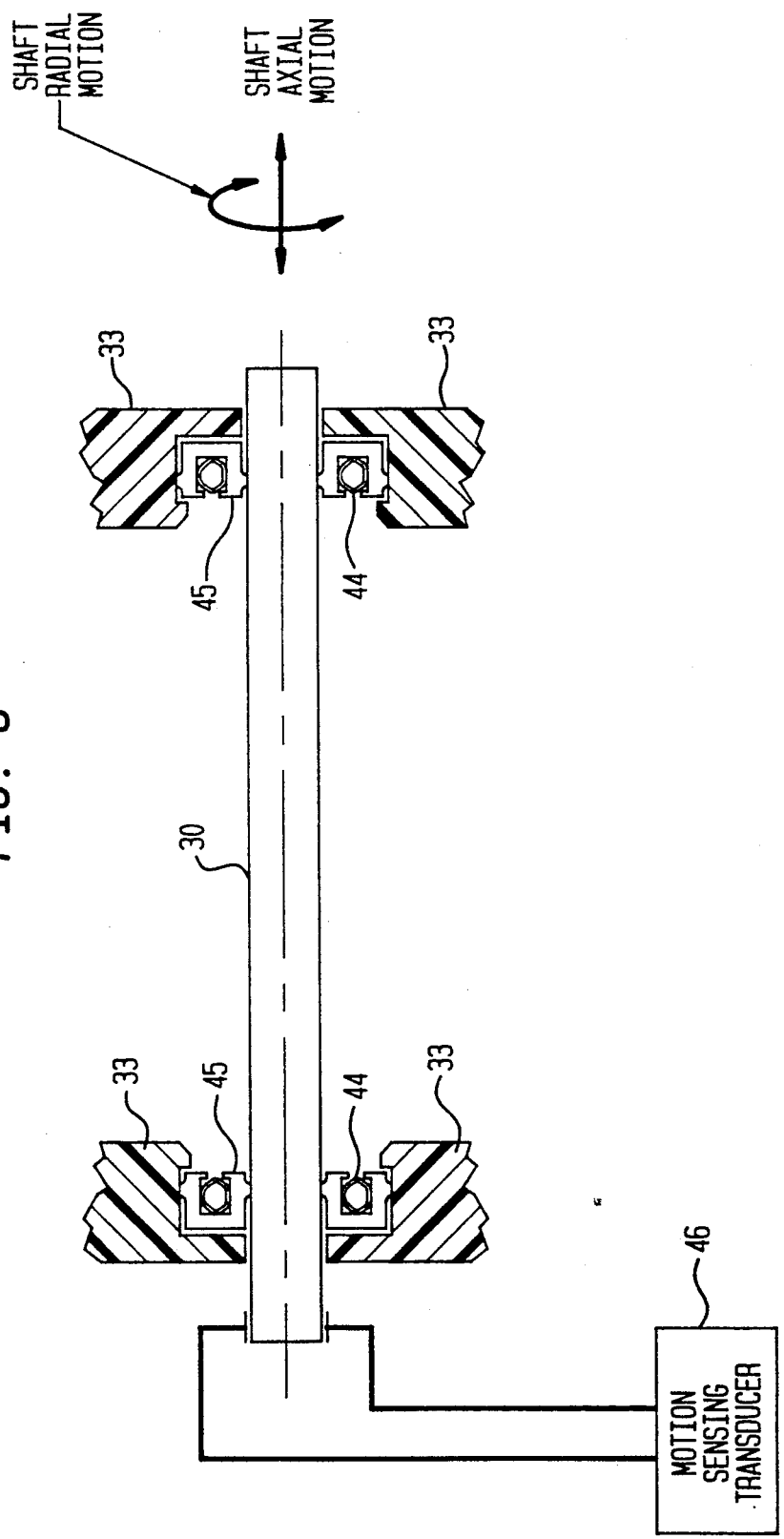
FIG. 6 is a partial sectional view showing details of the slide-bar cursor controller of FIG. 5.

Referring now to FIGS. 5 and 6, a slide-bar position control comprises a conductive cylindrical bar 30 mounted in a conductive enclosure 32. As will be appreciated by those skilled in the art, the bar 30 is so mounted in the enclosure 32 that it is free to both rotate about its longitudinal axis and translate back and forth along that axis. The slide-bar cursor control may be a stand-alone device or may be incorporated as part of a keyboard or other apparatus; this of course is also true of the ball-type cursor. The conductive enclosure for the slide-bar cursor control or the ball-type control thus may be a stand-alone enclosure or the enclosure may serve as an enclosure for the components in addition to the cursor control components.

The conductive bar 30 preferably comprises a plastic cylindrical member 33 with a conductive coating 35 of chrome or other suitable conductive coating. Similarly, the enclosure 32 preferably comprises a molded plastic base 34 with a suitable conductive coating 36 such as an aluminum coating. As in conventional slide-roller cursor controls, the bar 30 protrudes through an opening in the enclosure so that it can be manipulated by an operator; rotated to move the cursor in one direction and slid back and forth along its axis to move the cursor in the other direction. A pair of conductive bearings 40, shown in section in FIG. 6, support the bar 30 in the enclosure 32 and electrically couple the conducting surface 35 of the bar to the conducting coating 36 of the enclosure. The bearings 40 which may be of a suitable commercially available design, in this embodiment comprise a wound metallic core 44 in a U-shaped conductive plastic casing 45. The bearings 40 are secured to the enclosure so that in operation the bar rotates and slides relatively to the bearings. Conventional transducers 46 within the enclosure respond respectively to rotational and sliding motion of the bar. The outputs of these transducers are coupled to electronic components within the enclosure.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An electromagnetically shielded cursor control assembly comprising in combination:
   an electrically conductive movable cursor control element;
   an electrically conductive enclosure for housing control element motion transducers;
   an opening in said enclosure;
   means mounting said cursor control element in said opening so that said element can move relative to said enclosure; and
   a conductive band disposed in said opening coupling said enclosure and said cursor control element, said band being secured to said enclosure and having resilient conductive extensions which frictionally engage said cursor control element.

2. An electromagnetically shielded cursor control assembly comprising in combination:
   an electrically conductive cursor control ball;
   an electrically conductive enclosure housing cursor control ball motion transducers;
   an opening in said enclosure;
   means mounting said ball in aid opening so that said ball can rotate relatively to said housing;
   a conductive band disposed in said opening coupling said enclosure and said cursor control ball, said band being secured to said enclosure and having resilient conductive extensions which frictionally engage said ball.

3. An electromagnetically shielded cursor control assembly as in claim 1 further including means to seal said opening from environmental contaminants.

4. An electromagnetically shielded cursor control assembly as in claim 2 further including means to seal said opening from environmental contaminants.

* * * * *